United States Patent [19]

Doyle

[11] Patent Number: 4,773,757

[45] Date of Patent: Sep. 27, 1988

[54] HIGH RESOLUTION SPECTROMETER INTERFEROMETER HAVING AN INTEGRATED ALIGNMENT UNIT

[75] Inventor: Walter M. Doyle, Laguna Beach, Calif.

[73] Assignee: Laser Precision Corporation, Irvine, Calif.

[21] Appl. No.: 86,843

[22] Filed: Aug. 19, 1987

[51] Int. Cl.[4] .............................................. G01J 3/45
[52] U.S. Cl. ................................................... 356/346
[58] Field of Search ......................................... 356/346

[56] References Cited

U.S. PATENT DOCUMENTS

| | | | |
|---|---|---|---|
| 3,972,618 | 8/1976 | Hawes | 356/346 X |
| 4,537,508 | 8/1985 | Doyle | 356/346 |
| 4,556,316 | 12/1985 | Doyle | 356/346 |

Primary Examiner—Davis L. Willis
Assistant Examiner—Matthew W. Koren
Attorney, Agent, or Firm—Thomas J. Plante

[57] ABSTRACT

An interferometer structure is disclosed which has an integrated central mirror unit, which constitutes an integrated alignment unit permitting complete prealignment before the unit is incorporated into the interferometer. The integrated unit carries the beamsplitter and two folding mirrors. Alignment is accomplished by adjusting the positions of the two folding mirrors around vertical and horizontal axes. Both the stationary mirror and the movable mirror, which control the radiation path lengths in the two interferometer arms, are retroreflectors. Because of the folding mirror effect, resolution of the interferometer spectrometer system is significantly enhanced.

10 Claims, 6 Drawing Sheets

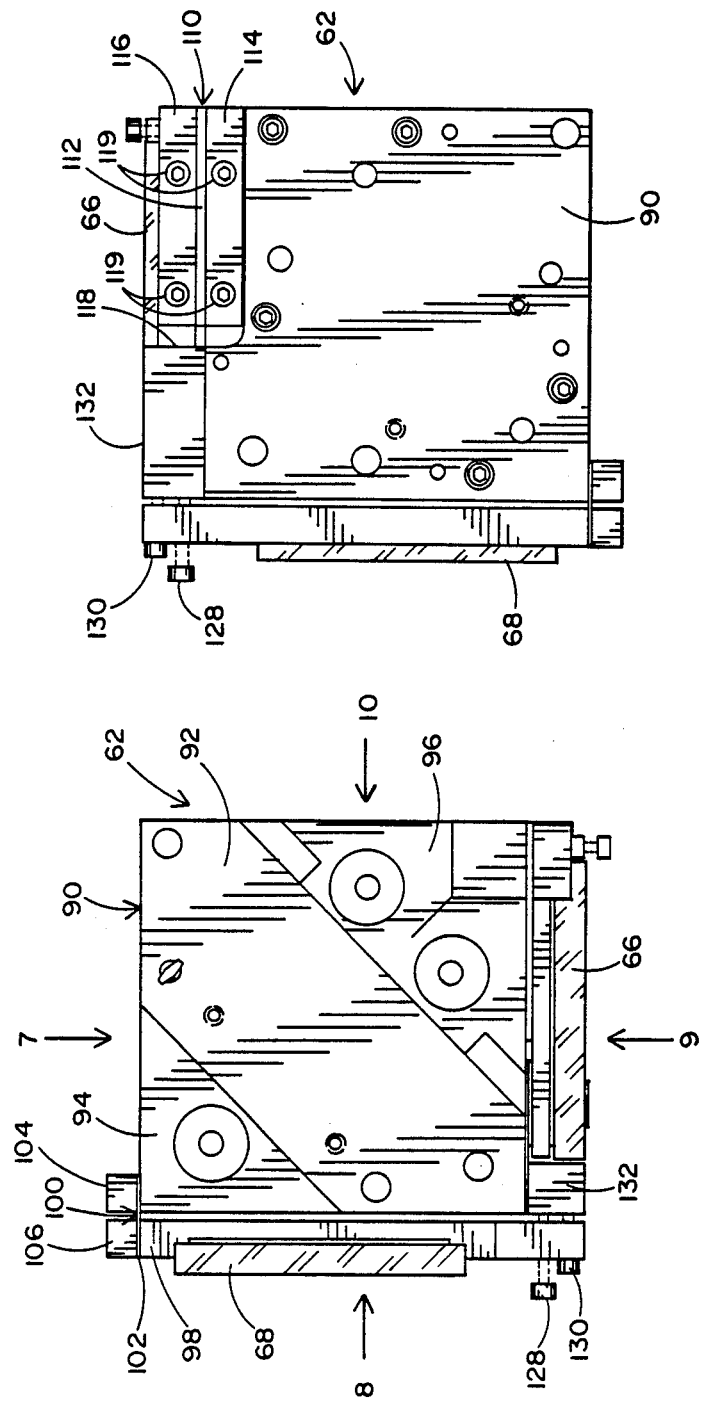

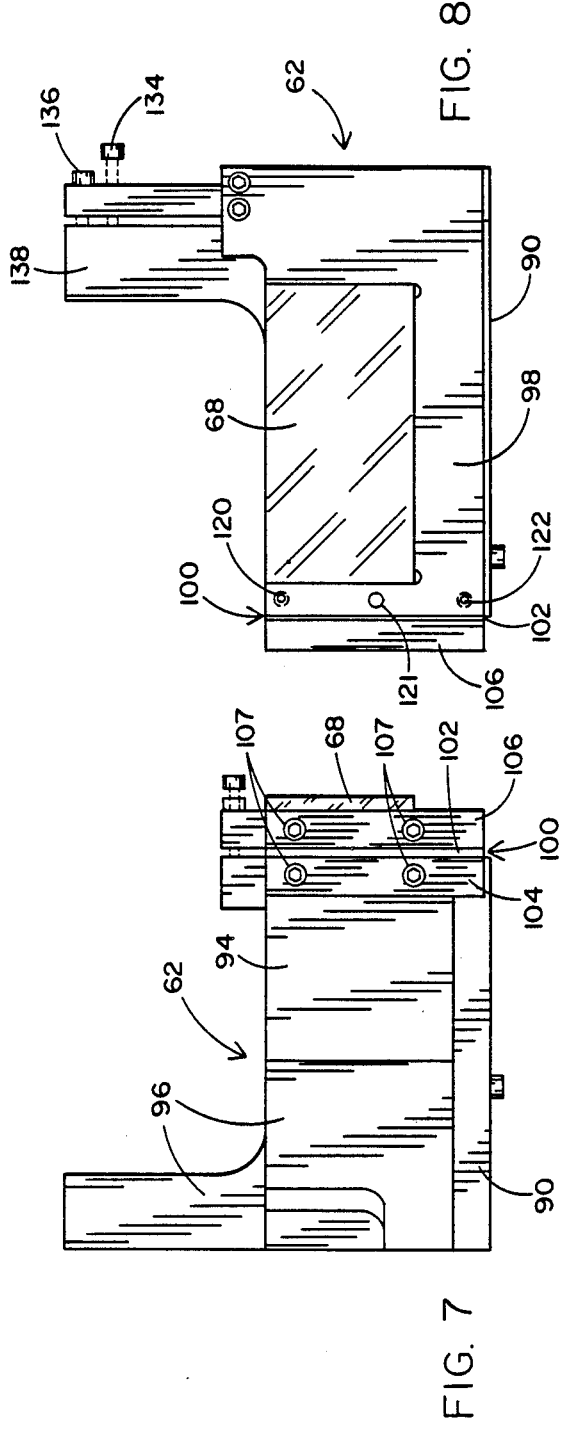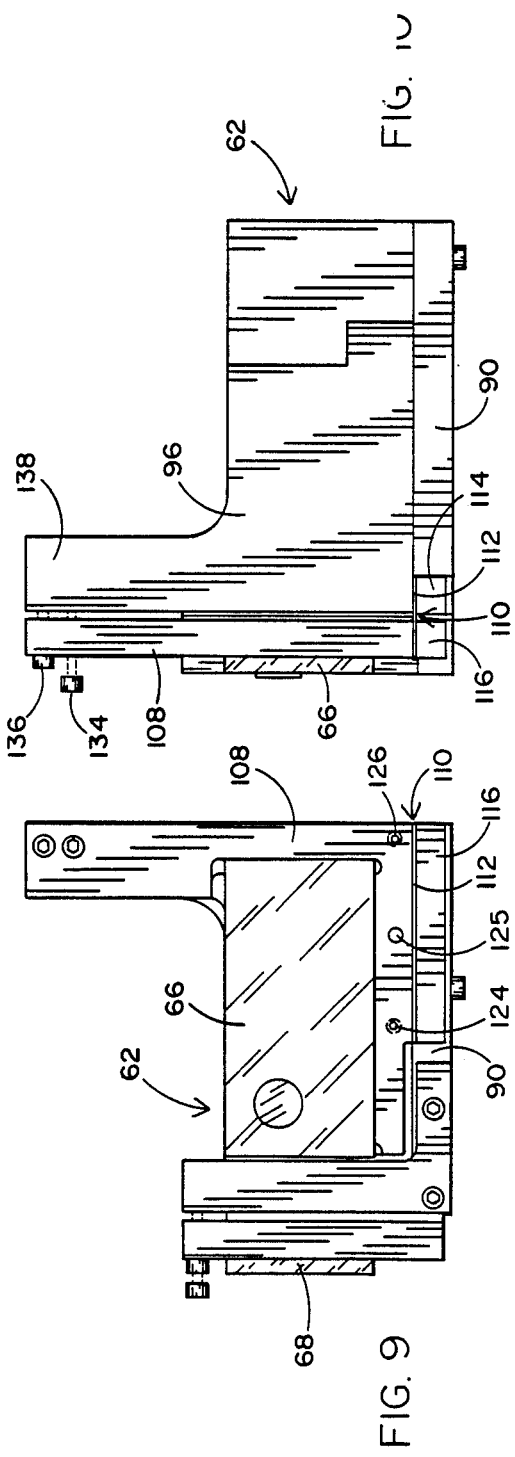

HIGH RESOLUTION SPECTROMETER INTERFEROMETER HAVING AN INTEGRATED ALIGNMENT UNIT

BACKGROUND OF THE INVENTION

This invention relates to interferometers used in spectral analysis instruments. It is concerned primarily with the desire to combine (a) high resolution, (b) improved alignment, and (c) easy replaceability of components.

In common assignee U.S. Pat. Nos. 4,537,508 and 4,556,316, interferometer spectrometer structures are disclosed in which one or both interferometer arms combine a retroreflector with a "folding" mirror which causes the radiation to retrace its path after it has been directed by the beamsplitter to the retroreflector. In certain embodiments, two retroreflectors are used to determine the lengths of the radiation paths in the interferometer arms, one retroreflector being movable, and the other stationary.

The "folding" effect provides a significant improvement in resolution, because a given increment of travel of the movable retroreflector produces a much greater differentiation between the lengths of the interferometer arms.

The present invention is intended to deal with certain limitations of the structures discussed above. One such limitation is sensitivity to temperature variations, which can cause misalignment in the optical system. Another limitation is the difficulty of changing beamsplitters to accommodate wavelength differences in the radiation employed in the system.

SUMMARY OF THE INVENTION

The present invention provides an interferometer having an integrated central mirror unit which includes a beamsplitter and two folding mirrors. Alignment of the beamsplitter and the two folding mirrors constitutes the only alignment required in the interferometer.

The beamsplitter and folding mirrors are supported on a solid isothermal base, which is adapted to be mounted on the platform of the complete interferometer. Thus the integrated central mirror unit: (a) is a removable component of the interferometer, and (b) contains within itself the entire alignment mechanism. This alignment is preferably accomplished by means of adjustable connections between each of the folding mirrors and the solid isothermal base.

The integrated central mirror unit is both isothermal and compact, in order to essentially eliminate distortion due to temperature variations. Because it is an integrated unit, or module, it may be readily replaced with another pre-aligned module whose beamsplitter is preferred for different wavelength analytical radiation.

The adjusting means for the two folding mirrors relative to the base are so arranged as to obtain adequate alignment adjustability in a very small space, in keeping with the compact modular construction of the integrated central mirror unit.

BRIEF DESCRIPTION OF THE DRAWINGS

FIGS. 5-10 are views showing the sub-assembly of FIG. 4 which constitutes the integrated central mirror unit. FIG. 5 is a top view, FIG. 6 a bottom view, and FIGS. 7, 8, 9 and 10 are elevation views of the four sides of the unit;

DETAILED DESCRIPTION OF PREFERRED EMBODIMENT

Figure 1:
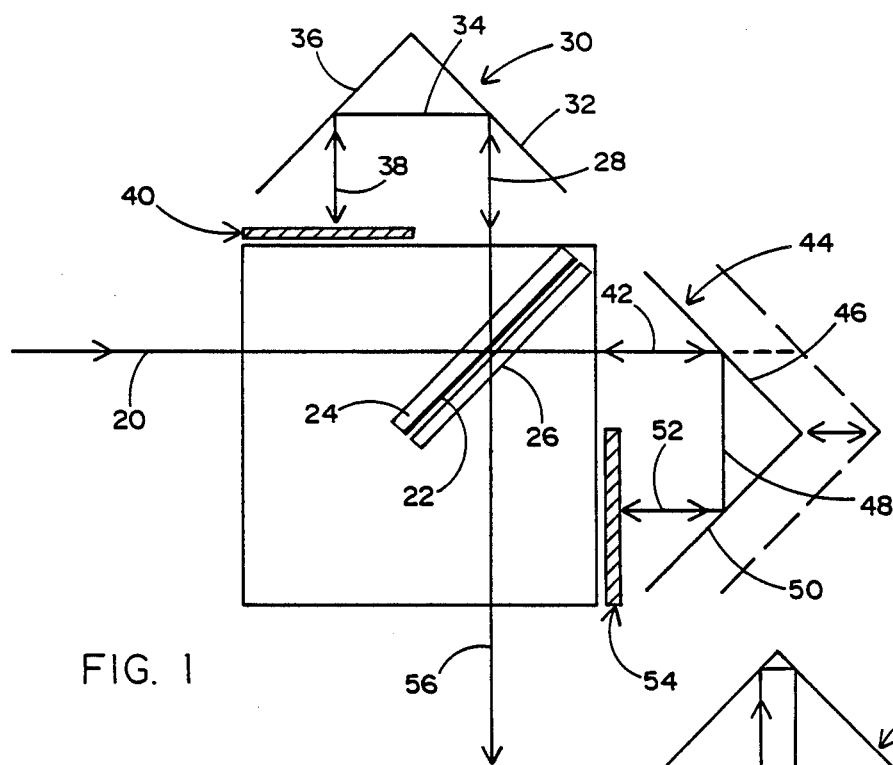
FIG. 1 is a plan view showing schematically the basic elements of the present invention.

As shown schematically in FIG. 1, an incoming analytical beam 20, from the infrared (IR) source, is partially reflected and partially transmitted by a beamsplitter coating 22. The beamsplitter structure, which is conventional, has two substantially identical transparent optical flats 24 and 26, one of which (24) has the beamsplitter coating 22 on its inner surface; and the other of which (26) serves as a compensating element.

The radiation reflected from beamsplitter 22 follows the path indicated by line 28 to reach a stationary retroreflector 30. After reflection from surface 32 of the retroreflector, the radiation follows the path indicated by line 34 to be reflected from surface 36 of the retroreflector. It then travels along the path indicated by line 38 to reach a mirror 40. This mirror may be referred to as "folding" mirror, because it causes the radiation to double back along the path 38 toward surface 36 of the retroreflector. The radiation is then reflected by surface 36 along path 34, and by surface 32 along path 28 back to beamsplitter 22.

The radiation transmitted through beamsplitter 22 follows the path indicated by line 42 to reach a movable retroreflector 44. (The movement of retroreflector 44, while retroreflector 30 remains stationary, causes the spectral scanning effect which provides the spectrogram). Surface 46 of retroreflector 44 reflects the radiation along path 48 to surface 50 of the same retroreflector. From surface 50, the radiation follows path 52 to reach a mirror 54, which, like mirror 40, acts as a "folding" mirror. Reflection from mirror 54 returns along path 52-48-42 to beamsplitter 22, where it recombines with the reflected beam 28; and the beam formed by the recombination (half of the incoming radiation) is directed along path 56 toward the sample region, and thence to a suitable radiation detector and to Fourier Transform electronics.

Figure 2:
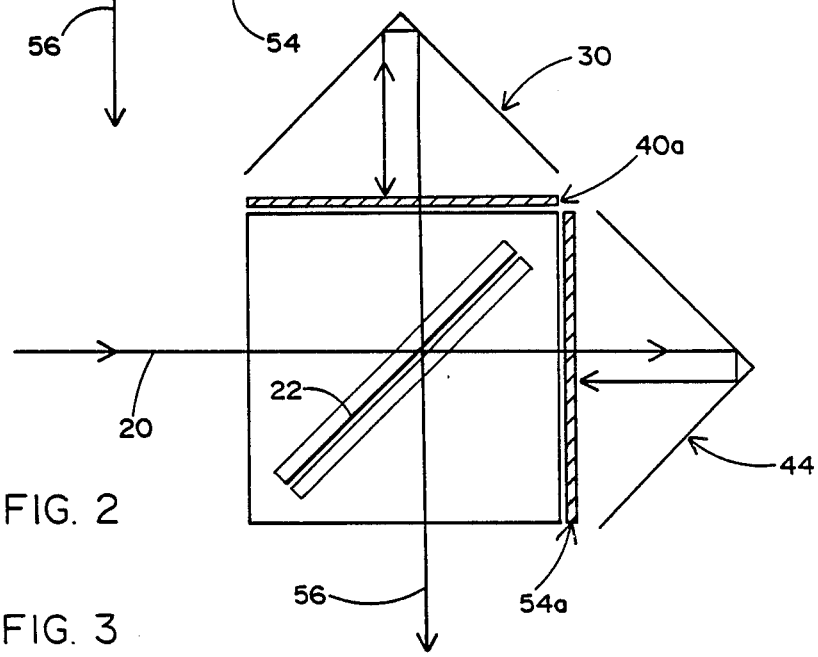
FIG. 2 is a view similar to FIG. 1, except that the folding mirrors extend horizontally below the analytical beam, instead of vertically at one side of the analytical beam.
Figure 3:
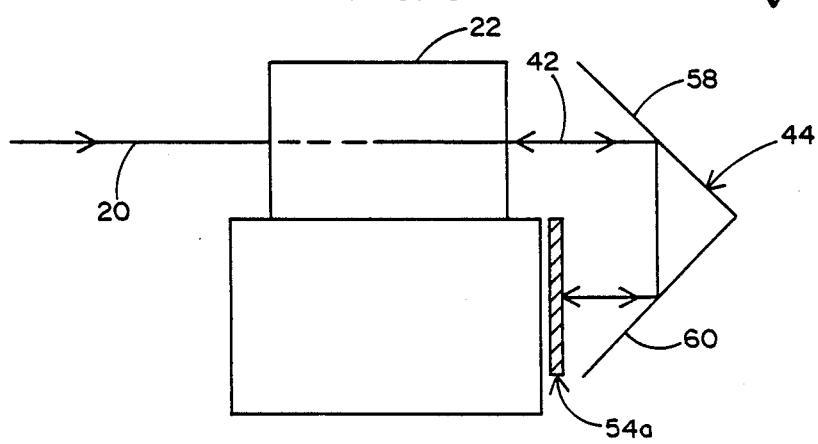
FIG. 3 is a side view of the FIG. 2 structure.

FIGS. 2 and 3 show a more practical design for operating apparatus. In comparing FIGS. 1 and 2, it is apparent that the folding mirrors 40 and 54 of FIG. 1, whose longitudinal dimensions are vertical, have, in effect, been turned 90° in FIG. 2, so that the longitudinal dimensions of the folding mirrors 40a and 54a of FIG. 2 are horizontal. Other elements in the FIG. 1 and FIG. 2 constructions are identical.

FIG. 3, which is the elevation view of the FIG. 2 arrangement, shows that the analytical beam 20-42 enters and returns above the folding mirrors. It is reflected by surface 58 of the retroreflector to follow a downward path, and by surface 60 of the retroreflector to follow a horizontal path toward and from the folding mirror.

In common assignee U.S. Pat. No. 4,537,508, the structure of FIG. 1 shows an arrangement schematically similar to FIGS. 1–3 of this disclosure. However, the detailed disclosure of that patent (FIGS. 2 and 3) has no integrating arrangement for the two folding mirrors and the beamsplitter. Also, it is significant that the preferred (and commercialized) embodiment in U.S. Pat. No. 4,537,508 was the one shown in FIGS. 6 and 7, which had the cost advantage of eliminating one retroreflector.

As stated in the Background discussion, the prior structures proved to be susceptible to misalignment as a result of temperature variations. And they also required realignment if beamsplitters were changed to accommodate wavelength differences.

In the present invention, optical alignment is determined entirely by the relative angular orientations of the beamsplitter and the two folding mirrors. Since these elements are mounted quite close together and on a structure which is designed to remain at a relatively uniform temperature, their relative alignment will be insensitive to temperature variations of the overall interferometer structure. Moreover, the support structure along with the beamsplitter, compensating plate, and folding mirrors can be removed as a unit and aligned independently of the rest of the interferometer. This facilitates easy alignment-free interchange of these assemblies. The key to the present invention is the fact that all of the elements which affect alignment (i..e., the beamsplitter, the compensator, and the two folding mirrors) are mounted on a relatively rigid and isothermal structure which has been referred to above as an integrated central mirror unit. Minor changes in the orientation of this unit as a whole will not affect alignment, nor will temperature changes of the structure as a whole. The distribution of temperature outside of this unit will have no effect on alignment. As a result of these factors, such integrated units for various spectral regions can be prealigned in a test jig, and then installed in the spectrometer at a later time, without requiring further alignment.

Figure 4:
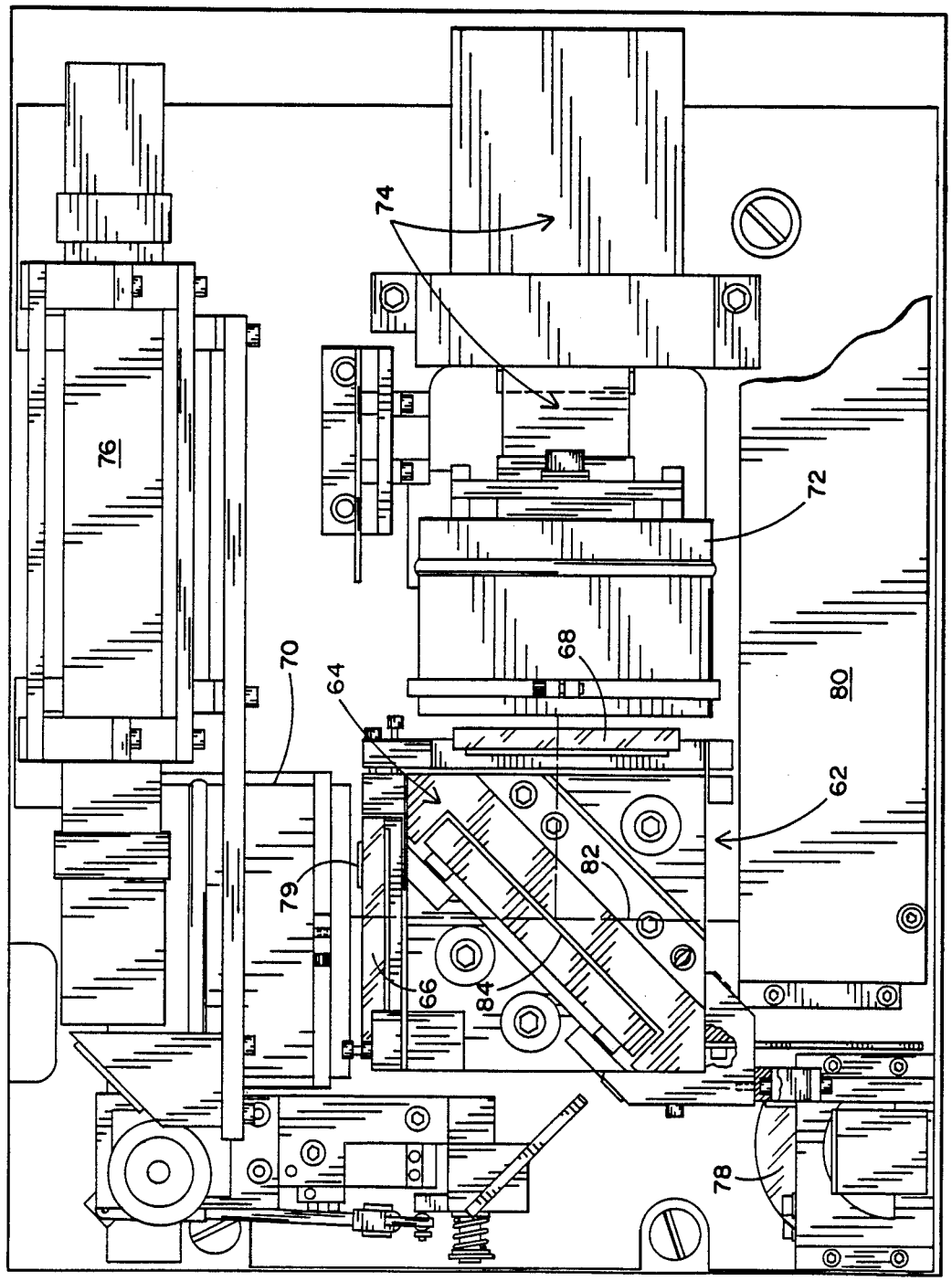
FIG. 4 is a plan view of a manufactured apparatus incorporating the concepts of the present invention.

FIG. 4 is a plan view of an actual interferometer structure incorporating the present invention. The integrated central mirror unit is indicated by numeral 62. It includes a beamsplitter structure 64, a first adjustably-mounted folding mirror 66, and a second adjustably-mounted folding mirror 68.

The exterior of a stationary retroreflector is shown at 70, and that of a movable retroreflector at 72, the latter being driven by a motor 74. The moving structure is supported on suitable anti-friction bearings, such as roller bearings or air bearings.

As discussed in detail in U.S. Pat. No. 4,537,508 (the disclosure of which is incorporated herein by reference), in addition to the IR analytical beam, interferometer spectrometer systems also generally utilize a laser beam to clock the sampling of detector signals, and a white light beam to start each spectral scanning sweep at the identical point in the spectrum. In FIG. 4 of this disclosure, the laser source is indicated at 76, and the white light source at 78. A small mirror 79 mounted on folding mirror 66 provides the offset between the white light and IR interferograms.

The IR source in FIG. 4 may be a separate module which is attached to the side of the interferometer housing. Its radiation is directed toward the beamsplitter by optical elements enclosed in a beam input structure 80. The analytical beam will follow a path 82 toward the beamsplitter surface 84, and will be partially reflected toward movable retroreflector 72, and partially transmitted toward stationary retroreflector 70.

FIGS. 5–10 show in detail the structure of the integrated central mirror unit 62, except that the beamsplitter has yet to be installed in unit 62. The arrows numbered 7, 8, 9 and 10 in FIG. 5 identify the respective side views shown in FIGS. 7, 8, 9 and 10. A base plate 90 provides a support and floor for the other elements of unit 62. The open portion 92 of floor 90 (FIG. 5) is the area to which the beamsplitter will be secured. Two mirror support members 94 and 96 are secured to floor 90. Mirror support member 94, which supports folding mirror 68, is smaller than mirror support member 96, which supports folding mirror 66. The reason for this size disparity of support members 94 and 96 is that mirror 68 is supported by a hinge which permits adjustment motion around a vertical axis; and mirror 66 is supported by a hinge which permits adjustment motion around a horizontal axis.

It would be ideal, from the standpoint of simplicity, if adjustment of one folding mirror solely around a vertical axis, and adjustment of the other folding mirror solely around a horizontal axis, were sufficient to provide optical alignment in unit 62. But that has not been feasible. So each folding mirror is adjustable around both vertical and horizontal axes. In each case, one adjustment is relatively coarse, and the other is a fine (more precise) adjustment. One folding mirror has its coarse adjustment around the horizontal axis and its fine adjustment around the vertical axis; the other folding mirror has its coarse adjustment around the vertical axis and its fine adjustment around the horizontal axis.

Each mirror is supported on a mirror mount which has a hinged connection with one of the mirror support members 94, 96. The hinges are preferably "living" hinges, i.e., hinges consisting of a thin plate of spring steel. The hinges (and the hinge arrangement in general) are desirable in the structure of the present invention, both because of their inherent stiffness, and because they conserve area in the center of the interferometer.

As best seen in FIGS. 5, 7 and 8, folding mirror 68 is carried by a mirror mount 98 which is hinged at 100, for movement around a vertical axis. The hinge is provided by a "living" hinge flat spring 102, which is secured to mirror supporting member 94 by a hinge holder 104, and is secured to mirror mount 98 by a hinge holder 106. As seen in FIG. 7, the hinge holders 104 and 106 are secured to members 94 and 98 by cap screws 107.

As best seen in FIGS. 6, 9 and 10, folding mirror 66 is carried by a mirror mount 108 which is hinged at 110, for movement around a horizontal axis. The hinge is provided by a "living" hinge flat spring 112, which is secured to the bottom of mirror supporting member 96 by a hinge holder 114, and is secured to mirror mount 108 by a hinge holder 116. Note that the base plate 90 is recessed at 118 (FIG. 6) to provide space for hinge holders 114 and 116 below mirror supporting member 96. As seen in FIG. 6, the hinge holders 114 and 116 are secured to members 96 and 108 by cap screws 119.

Coarse adjustment of either mirror 66 or mirror 68 is accomplished by adjusting its hinge. In the case of mirror 68, whose mount is hinged at 100, this hinge adjustment is around a horizontal axis. It is accomplished by loosening the two cap screws 107 in hinge holder 106, and then causing relative tilting movement between mirror mount 98 and hinge spring 102 by means of three screws 120, 121 and 122 (FIG. 8). The center screw 121 has its end butting against a rigid member, and thus creates a pivot point (horizontal axis). The upper and lower screws 120 and 122 are turned in opposite directions to make an alignment adjustment of the mirror 68 about a horizontal axis. Then the two cap screws 107 are tightened to retain the adjusted position. In the case of mirror 66, whose mount is hinged at 110, this hinge adjustment is around a vertical axis. It is accomplished by loosening the two cap screws 119 in hinge holder 116, and then causing relative tilting movement between mirror mount 108 and hinge spring 112 by means of three screws 124, 125 and 126 (FIG. 9). The center screw 125 has its end butting against a rigid member, and thus creates a pivot point (vertical axis). The left and right screws 124 and 126 are turned in opposite directions to make an alignment adjustment of the mirror 66 about a vertical axis. Then the two cap screws 119 are tightened to retain the adjusted position.

Fine adjustment of either mirror 66 or mirror 68 is accomplished by using threaded members to cause pivotal movement around the respective hinge. In the case of mirror 68, whose mount is hinged at 100, the threaded adjustment members are shown at 128 and 130 (FIGS. 5 and 6). The screw 130 has a clearance hole in mirror mount 98, but is threaded into an adjustment post 132. The screw 128 is threaded into mirror mount 98, but butts against post 132. Turning screws 128 and 130 provides alignment adjustment of mirror 68 around a vertical axis. In the case of mirror 66, whose mount is hinged at 110, the threaded adjustment members are shown at 134 and 136 (FIGS. 8 and 10). The screw 136 has a clearance hole in mirror mount 108, but is threaded into an adjustment post 138, which is an integral part of member 96. The screw 134 is threaded into mirror mount 108, but butts against post 138. Turning screws 134 and 136 provides alignment adjustment of mirror 66 around a horizontal axis.

Figure 14:
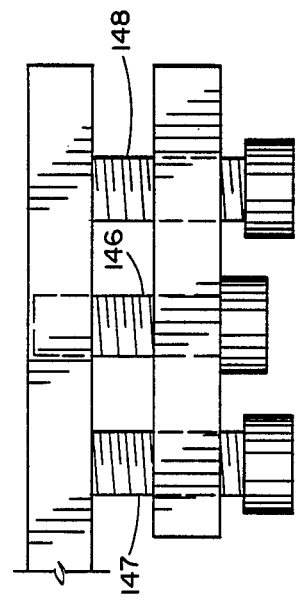
FIGS. 13 and 14 are cutaway sections showing in detail the threaded adjusting elements used in aligning the folding mirrors.
Figure 13:
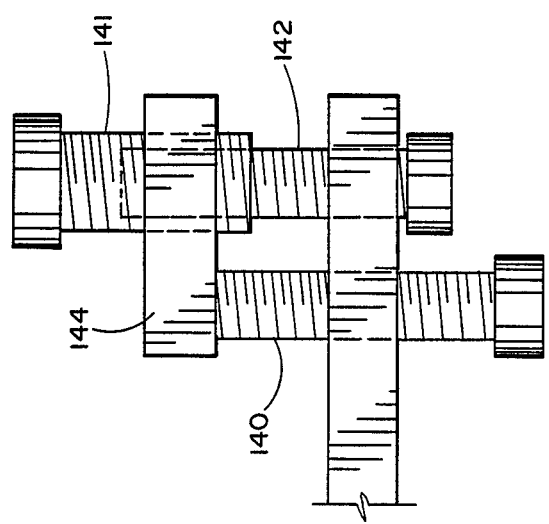

In order to obtain even finer alignment adjustment of the movement around each hinge, the construction shown in FIG. 13 has been adopted, replacing the two adjustment screws for each mirror mount with three adjustment screws 140, 141 and 142. Screw 140 provides the engagement with a post 144. Screw 141 is threaded into post 144; and screw 142 is threaded into screw 141. Differential pitches on screws 141 and 142 permit an extremely fine position adjustment. FIG. 14 is an enlarged view of the three screws which provide the initial coarse adjustment around the other axis. A center screw 146 is threaded into the mirror mount to determine the pivot point, and screws 147 and 148, on opposite sides of pivot screw 146, are in engagement with the mirror mount to permit pivotal adjustment.

An important aspect of the integrated central mirror unit 62 shown in FIGS. 5-10 is its isothermal design. This means that all parts in this unit should be formed of material having substantially the same thermal coefficient of expansion. It is also desirable to use material having relatively low thermal expansion. But having an essentially isothermal unit is particularly vital, in order to avoid nonuniform responses to temperature change, which could create distortion and misalignment. At present, the preferred material for all parts of unit 62, including the threaded adjusting members, is stainless steel. The material should be fully annealed prior to final machining. Materials having higher thermal coefficients of expansion, such as aluminum, are not considered desirable. Ceramic components would be desirable, because of their relative insensitivity to thermal effects, but their manufacturing costs are a significant deterrent to their use.

Figure 12:
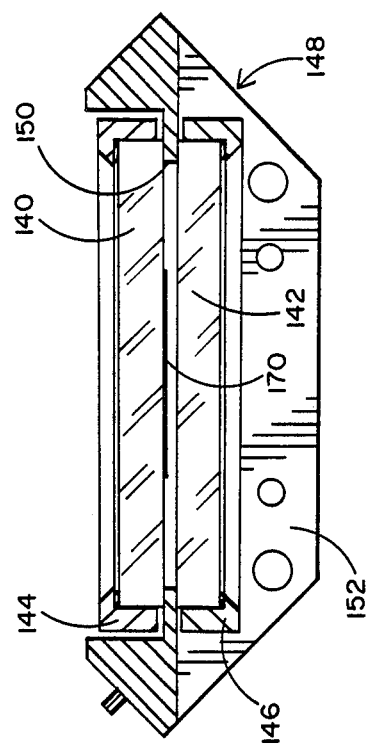
FIGS. 11 and 12 are, respectively, an elevation view, and a cross-section in a horizontal plane, showing the beamsplitter structure which is inserted into the integrated mirror unit of FIGS. 5-10.
Figure 11:
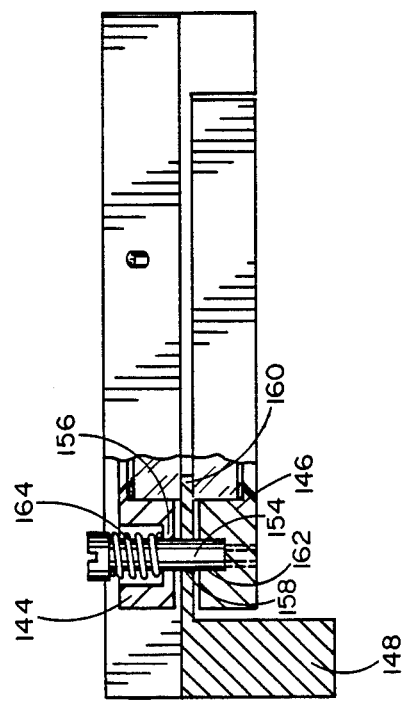

FIGS. 11 and 12 show the beamsplitter/compensator assembly which is mounted in the integrated alignment unit 62 (in the area 92 of FIG. 5). In FIG. 12, a crosssection taken along a horizontal plane shows two transparent plates 140 and 142, formed of a material such as potassium bromide (KBr), and carried, respectively, in separate metal holders 144 and 146. The holders 144 and 146 are carried by a bracket 148, which has an open center port 150, and an integral base plate 152 secured to the floor 90 of unit 62. The holders and their transparent plates are secured in position by a plurality of threaded members 154 (see FIG. 11), each of which extends through a clearance hole 156 in holder 144 and a positioning hole 158 in the vertical portion 160 of bracket 148, and is in threaded engagement with a recess 162 in holder 146. In order to avoid excessive pressure on the transparent plates 140 and 142, the force holding them in position at each threaded member 154 is created by a spring 164 mounted between a surface on holder 144 and the head of threaded member 154.

As seen in FIG. 12, a beamsplitter coating 170 is provided on the inner surface of plate 140. Plate 142 serves as a compensating plate, which is equal in thickness to plate 140 and is formed of identical material.

With the beamsplitter mounted in the integrated alignment unit 62, complete optical alignment can be accomplished before unit 62 is assembled into the interferometer. All alignment functions are confined to unit 62. Therefore, prealignment is made by the manufacturer, and is not performed by the user. If the user has needs for beamsplitters suitable for different wavelengths, a plurality of integrated alignment units 62 can be acquired by the user, and interchanged at will in the interferometer, without any alignment requirements. From time to time, deterioration of a given beamsplitter may require its replacement, in which case realignment of the integrated alignment unit 62 will be necessary.

As stated above, because unit 62 is very compact, has an isothermal structure, and is replaceable as a unit, it provides very significant practical advantages for users of the interferometer spectrometer system in which it is incorporated. Because two folding mirrors 66 and 68 are used, the stationary mirror 70 (FIG. 4), as well as the movable mirror 72, must be retroreflectors. The retroreflectors shown are corner cubes, but other types of retroreflectors, such as cats-eye retroreflectors, would be suitable. It is desirable that the two retroreflectors be located as close to unit 62 as is mechanically feasible.

As stated above, the extra lengths of the radiation paths, resulting from the light traveling to and from the folding mirrors 66 and 68, provide a significant gain in resolution in the spectrogram output of the interferometer spectrometer.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. For use in spectral analysis an interferometer of the type having a beamsplitter and two radiation paths, comprising:
   a stationary retroreflector at the end of the first radiation path of the interferometer;
   a movable retroreflector at the end of the second radiation path of the interferometer, whose movements cause a variation in the relative lengths of the first and second radiation paths; and
   an integrated central mirror unit which includes the beamsplitter, and which also includes:
   (a) a first flat mirror which receives radiation reflected by the stationary retroreflector and reflects it back to the stationary retroreflector;
   (b) a second flat mirror which receives radiation reflected by the movable retroreflector and reflects it back to the movable retroreflector; and
   (c) means for adjusting the positions of the first and second flat mirrors, in order to provide optical alignment of the interferometer.

2. The interferometer of claim 1 in which the integrated central mirror unit includes a supporting structure which carries the beamsplitter and the first and second flat mirrors, and which is composed of components which have approximately the same thermal expansion coefficients, in order to avoid nonuniform sensitivity of the unit to thermal changes.

3. The interferometer of claim 2 in which the components of the integrated mirror unit, including those in the adjusting means, are formed of stainless steel.

4. The interferometer of claim 1 which comprises:
   a first mirror mount which carries one of the flat mirrors, and which is hinged at one end in such a way as to be adjustable about a substantially horizontal axis for alignment purposes; and
   a second mirror mount which carries the other flat mirror, and which is hinged at one end in such a way as to be adjustable about a substantially vertical axis for alignment purposes.

5. The interferometer of claim 2 which comprises:
   a first mirror mount which carries one of the flat mirrors, and which is hinged at one end in such a way as to be adjustable about a substantially horizontal axis for alignment purposes; and
   a second mirror mount which carries the other flat mirror, and which is hinged at one end in such a way as to be adjustable about a substantially vertical axis for alignment purposes.

6. The interferometer of claim 4 in which each of the mirror mounts is adjustable with respect to its hinge in such a way as to be pivotally movable for alignment purposes at right angles to its direction of hinged movement.

7. The interferometer of claim 5 in which each of the mirror mounts is adjustable with respect to its hinge in such a way as to be pivotally movable for alignment purposes at right angles to its direction of hinged movement.

8. The interferometer of claim 1 in which alignment of the first and second flat mirrors constitutes the sole alignment procedure required in the interferometer.

9. The interferometer of claim 1 in which the integrated central mirror unit is adapted to be aligned before insertion into the interferometer, and is adapted to be readily inserted into and removed from the interferometer.

10. The interferometer of claim 1 which also comprises:
    a secondary radiation system in the interferometer which synchronizes the successive spectral analysis data sweeps; and a small flat mirror which is mounted on either the first or second flat mirror, and which causes the secondary radiation system to have a predetermined timing offset from the analytical radiation system.

* * * * *